United States Patent
Ishikura

(10) Patent No.: US 10,094,462 B2
(45) Date of Patent: Oct. 9, 2018

(54) DAMPER PULLEY MANUFACTURING METHOD AND DAMPER PULLEY MANUFACTURING APPARATUS

(71) Applicant: JTEKT CORPORATION, Osaka-shi (JP)

(72) Inventor: Tomohito Ishikura, Chiryu (JP)

(73) Assignee: JTEKT CORPORATION, Osaka-shi (JP)

( * ) Notice: Subject to any disclaimer, the term of this patent is extended or adjusted under 35 U.S.C. 154(b) by 350 days.

(21) Appl. No.: 14/892,432

(22) PCT Filed: May 8, 2014

(86) PCT No.: PCT/JP2014/062336
§ 371 (c)(1),
(2) Date: Nov. 19, 2015

(87) PCT Pub. No.: WO2014/188878
PCT Pub. Date: Nov. 27, 2014

(65) Prior Publication Data
US 2016/0102749 A1    Apr. 14, 2016

(30) Foreign Application Priority Data
May 24, 2013 (JP) .................................. 2013-110206

(51) Int. Cl.
*F16H 55/36* (2006.01)
*B23P 19/10* (2006.01)
(Continued)

(52) U.S. Cl.
CPC .............. *F16H 55/36* (2013.01); *B23P 19/02* (2013.01); *B23P 19/10* (2013.01); *B23P 11/02* (2013.01);
(Continued)

(58) Field of Classification Search
CPC ......... Y10T 29/49455; Y10T 29/49895; Y10T 29/49899; Y10T 29/49909;
(Continued)

(56) References Cited

U.S. PATENT DOCUMENTS

2004/0200071 A1* 10/2004 Radocaj .................. B21K 1/42
29/892.11
2006/0172832 A1    8/2006 Watanabe et al.

FOREIGN PATENT DOCUMENTS

CA     2 246 058 C    9/2002
CN     1823239 A      8/2006
(Continued)

OTHER PUBLICATIONS

Translation of JPS60175534, generated Dec. 13, 2017.*
(Continued)

*Primary Examiner* — Matthew P Travers
(74) *Attorney, Agent, or Firm* — Oblon, McClelland, Maier & Neustadt, L.L.P.

(57) ABSTRACT

A damper pulley manufacturing method includes an arranging process in which a circular hub having a cylindrical outer peripheral surface and a circular pulley having a cylindrical inner peripheral surface are arranged such that the cylindrical outer peripheral surface opposes the cylindrical inner peripheral surface, a centering process in which a tapered portion of a first centering jig is made to abut on an axial end portion of the hub and a tapered portion of a second centering jig is made to abut on an axial end portion of the pulley to perform centering of the hub and the pulley, and a press-fitting process in which after the centering process, a damper rubber is press-fitted between the cylindrical outer peripheral surface and the cylindrical inner peripheral surface.

7 Claims, 8 Drawing Sheets

(51) Int. Cl.
  *B23P 19/02*  (2006.01)
  *F16F 15/12*  (2006.01)
  *B23P 11/02*  (2006.01)

(52) U.S. Cl.
  CPC ....... *B23P 2700/50* (2013.01); *F16F 15/1203* (2013.01); *F16F 2226/045* (2013.01); *F16H 2055/366* (2013.01); *Y10T 29/49455* (2015.01); *Y10T 29/49895* (2015.01); *Y10T 29/49945* (2015.01)

(58) Field of Classification Search
  CPC ......... Y10T 29/49945; Y10T 29/53652; Y10T 29/53657; Y10T 29/53961; Y10T 29/53978; F16H 55/36; F16H 2055/366; F16F 7/04; F16F 15/12; F16F 15/1203; F16F 2226/045; B30B 9/00; B23P 11/02; B23P 15/00; B23P 19/02; B23P 19/027; B23P 19/04; B23P 19/047; B23P 19/10; B23P 2700/50
  See application file for complete search history.

(56) References Cited

FOREIGN PATENT DOCUMENTS

| | | |
|---|---|---|
| CN | 101502874 A | 8/2009 |
| CN | 202028947 U | 11/2011 |
| JP | 60-175534 U | 11/1985 |
| JP | 62-159277 U | 10/1987 |
| JP | 05-025048 U | 4/1993 |
| JP | 2007-009932 A | 1/2007 |

OTHER PUBLICATIONS

Translation of JPS62159277, generated Dec. 13, 2017.*
International Search Report dated Aug. 5, 2014 for PCT/JP2014/062336 filed on May 8, 2014.
Combined Office Action and Search Report dated Nov. 18, 2016 in Chinese Patent Application No. 201480029717.7 (with English translation).

* cited by examiner (CENTERING PROCESS)

(COMPARATIVE EXAMPLE)

DAMPER PULLEY MANUFACTURING METHOD AND DAMPER PULLEY MANUFACTURING APPARATUS

TECHNICAL FIELD

An aspect of the present invention relates to a damper pulley manufacturing method and a damper pulley manufacturing apparatus.

BACKGROUND ART

Conventionally, there is used a damper pulley that is coupled, for example, to a crankshaft of the engine of a vehicle and absorbs torsional vibrations caused in association with the rotation of the crankshaft. The damper pulley has a structure in which a metallic pulley is concentrically coupled through a damper rubber made of an annular elastic body to the outer periphery of a metallic hub fixed to the crankshaft. As a method for manufacturing this damper pulley, a manufacturing method described in Patent Document 1 is known.

In the damper pulley manufacturing method described in Patent Document 1, an elastic body molded of a rubber elastic material in an annular shape is disposed in a state of being loosely fitted, between an outer peripheral tubular portion formed in the shape of a conical tube on the outer peripheral portion of a hub made of a compact of a metallic plate and an annular mass body concentrically disposed on the inner periphery side, and this outer peripheral tubular portion is drawn toward the inner periphery side into a cylindrical shape, whereby the outer peripheral tubular portion, the elastic body and the annular mass body are pressure-welded together. After this drawing process, finishing of a pulley groove formed on the outer peripheral surface of the outer peripheral tubular portion is performed by rolling.

According to this damper pulley manufacturing method described in Patent Document, it is considered that since the process of disposing the elastic body between the outer peripheral tubular portion of the hub and the annular mass body and the process of providing the elastic body with precompression are separate from each other, the elastic body can be fitted between the outer peripheral tubular portion of the hub and the annular mass body in an appropriate radially compressed state without the use of a method such that the elastic body is press-fitted between the outer peripheral tubular portion of the hub and the annular mass body from one side in the axial direction and this facilitates the manufacture of a fitting type damper pulley.

RELATED ART DOCUMENTS

Patent Documents

Patent Document 1: JP-A-2007-9932

SUMMARY OF THE INVENTION

Problem to be Solved by the Invention

However, according to the manufacturing method described in Patent Document 1, the following problem arises: Since alignment is made by a rubber elastic material press-fitted in a gap portion with the annular mass body disposed concentrically with the outer peripheral tubular portion without performing centering of the outer peripheral tubular portion formed in the shape of a conical tube on the outer peripheral portion of the hub and the annular mass body concentrically disposed on the inner periphery side, in order to satisfy a required deflection accuracy (the coaxiality of the outer peripheral tubular portion with reference to the central axis) of the damper pulley, finishing of the pulley groove formed on the outer peripheral surface of the outer peripheral tubular portion is required.

Accordingly, an object of an aspect of the present invention is to provide a damper pulley manufacturing method and a damper pulley manufacturing apparatus capable of reducing the runout due to a misalignment between the hub and the pulley.

Means for Solving the Problem

In one aspect of the present invention, for example, in order to achieve the above-described object, a damper pulley manufacturing method includes: an arranging process in which a circular hub having a cylindrical outer peripheral surface and a circular pulley having a cylindrical inner peripheral surface are arranged such that the cylindrical outer peripheral surface opposes the cylindrical inner peripheral surface; a centering process in which a tapered portion of a first centering jig is made to abut on an axial end portion of the hub and a tapered portion of a second centering jig is made to abut on an axial end portion of the pulley to perform centering of the hub and the pulley; and a press-fitting process in which after the centering process, a damper rubber is press-fitted between the cylindrical outer peripheral surface and the cylindrical inner peripheral surface.

In another aspect of the present invention, for example, in order to achieve the above-described object, a damper pulley manufacturing apparatus includes: an upper jig including: a centering jig including a hub centering jig that performs centering by making a tapered portion abut on an axial end portion of a circular hub having a cylindrical outer peripheral surface, and a pulley centering jig that performs centering by making a tapered portion abut on an axial end portion of a circular pulley having a cylindrical inner peripheral surface; and a pressing jig that presses the hub and the pulley in an axial direction; a lower jig that sandwiches the hub and the pulley with the upper jig to support the hub and the pulley; and a press-fitting jig that press-fits a damper rubber into a gap portion between the cylindrical outer peripheral surface of the hub and the cylindrical inner peripheral surface of the pulley.

Advantages of the Invention

According to one aspect of the present invention, it is possible to reduce runout due to a misalignment between the hub and the pulley.

MODE FOR CARRYING OUT THE INVENTION

A manufacturing apparatus and a manufacturing method according to an embodiment of the present invention will be described with reference to FIG. 1 to FIG. 8.

(Structure of a Damper Pulley Manufacturing Apparatus)

Figure 1:
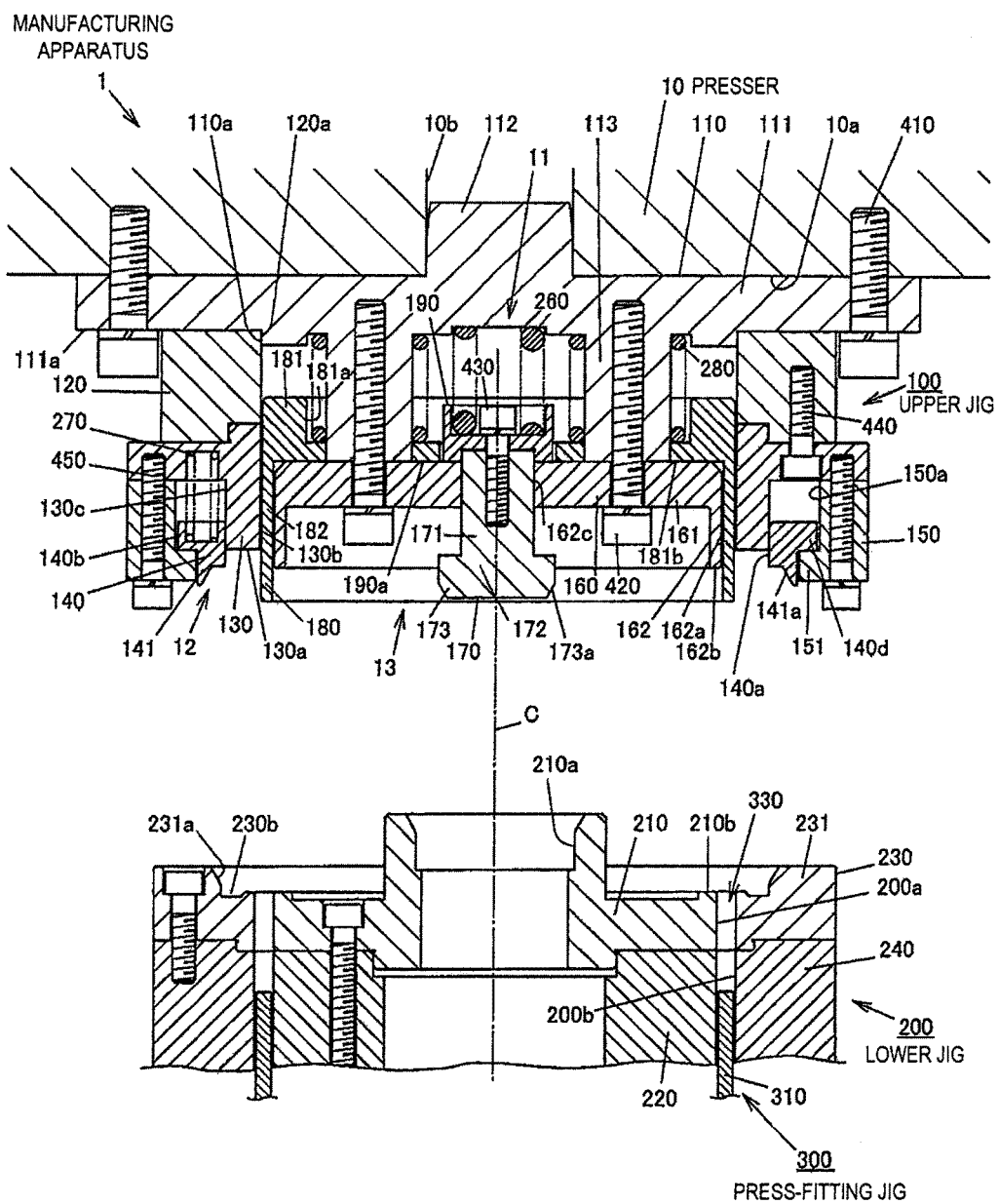
FIG. 1 is a cross-sectional view showing a damper pulley manufacturing apparatus according to an embodiment.
Figure 2:
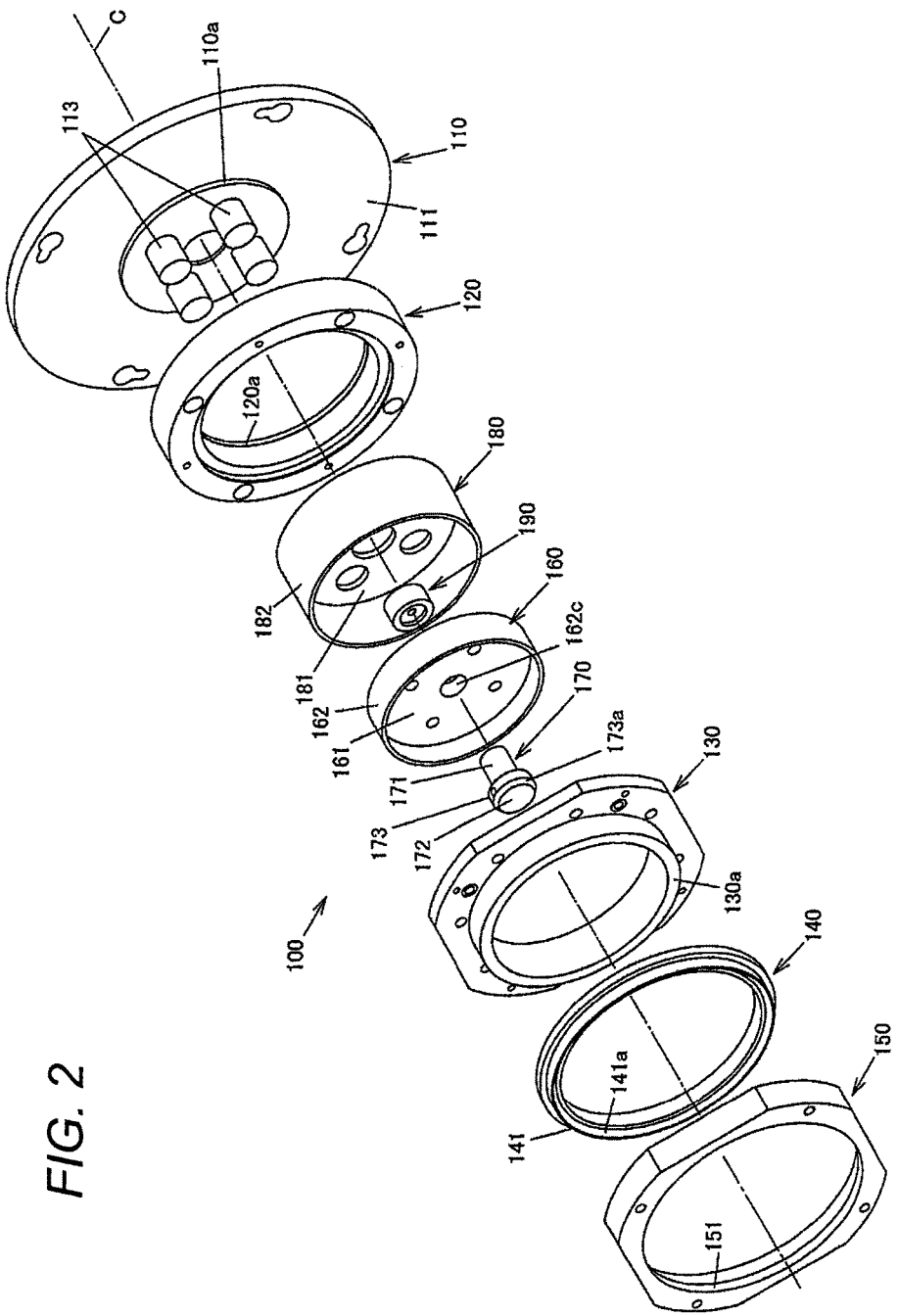
FIG. 2 is an exploded perspective view showing the structure of an upper jig constituting the damper pulley manufacturing apparatus.
Figure 3:
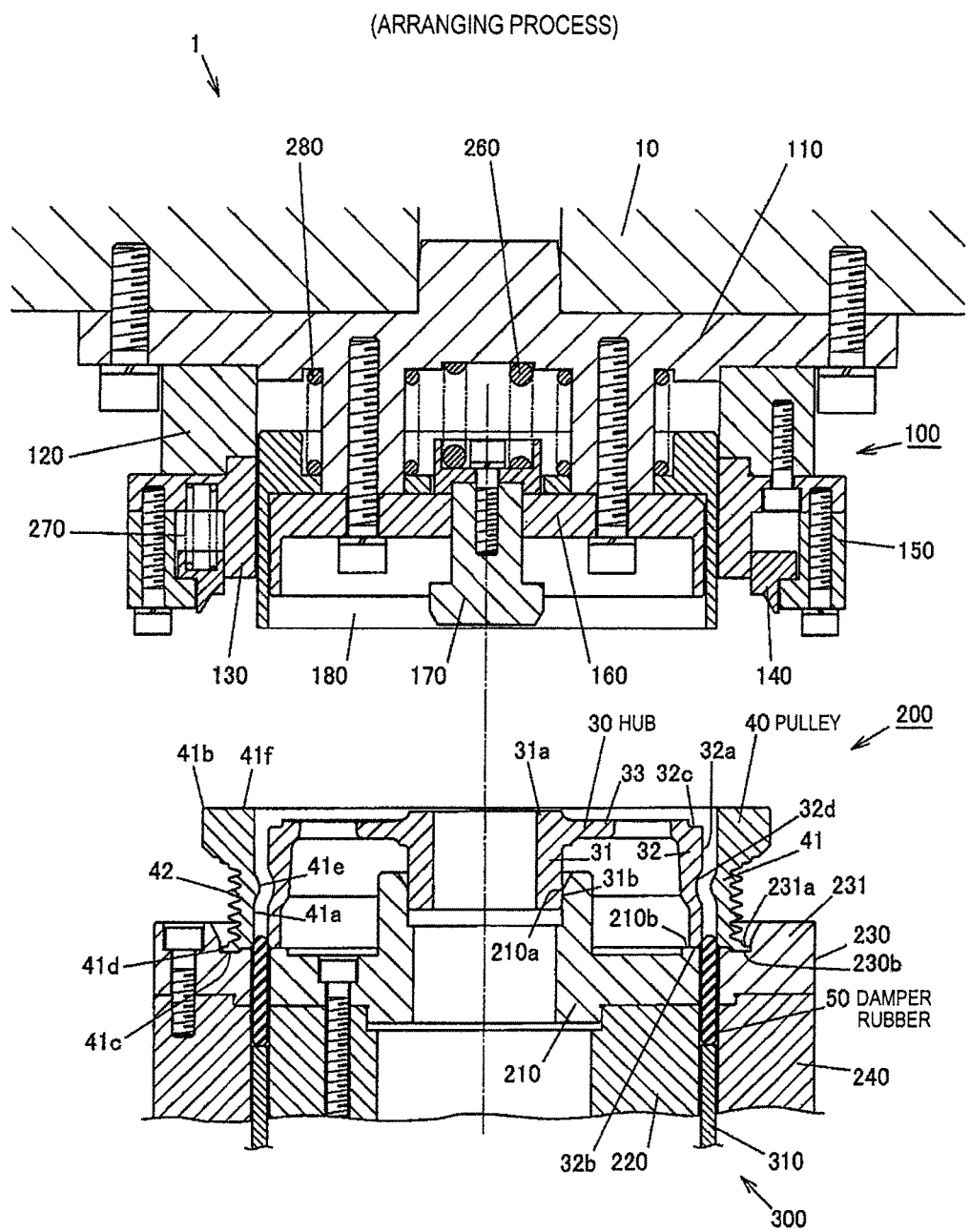
FIG. 3 is a cross-sectional view of a damper pulley and the manufacturing apparatus showing a damper pulley arranging process.

FIG. 1 is a cross-sectional view showing a damper pulley manufacturing apparatus according to the embodiment of the present invention. FIG. 2 is an exploded perspective view showing the structure of an upper jig in the damper pulley manufacturing apparatus. FIG. 3 is a cross-sectional view showing the damper pulley manufacturing apparatus together with a hub and a pulley as work.

The damper pulley manufacturing apparatus 1 is generally formed of the upper jig 100 attached to a presser 10 so as to be moved downward by being pressed down, a lower jig 200 mounted on a base (not shown) placed on a floor portion (not shown), and a press-fitting jig 300.

In this manufacturing apparatus 1, as shown in FIG. 3, the hub 30 and the pulley 40 as work and a damper rubber 50 are disposed between the upper jig 100 and the lower jig 200 and centered, and the damper rubber 50 is press-fitted by the press-fitting jig 300 into a gap portion formed between the hub 30 and the pulley 40. A damper pulley is manufactured by a series of processes of an arranging process, a centering process and a press-fitting process by this damper pulley manufacturing apparatus 1.

(Structure of the Upper Jig 100)

The upper jig 100 is structured so as to be provided with a base board 110, a hub centering jig 11 as the first centering jig that performs centering of the hub 30, a pulley centering jig 12 as the second centering jig that performs centering of the pulley 40, and a pressing jig 13 that presses the hub 30 and the pulley 40 in the axial direction toward the lower jig 200.

The base board 110 has a disk-shaped flange portion 111 attached to a lower surface 10a of the presser 10, a fitting convex portion 112 fitted in a fitting hole 10b of the presser 10, and more than one (four in the present embodiment) cylindrical boss portion 113 protruding downward from a lower surface 111a of the flange portion 111. The boss portions 113 are, for example as shown in FIG. 2, equally spaced around the central axis C. The base board 110 is fixed to the presser 10 by a bolt 410 passing through the flange portion 111.

To the lower surface 111a of the flange portion 111 on the base board 110, a pulley pressing base 120 is fixed. The pulley pressing base 120 is, as shown in FIG. 2, a circular member, and an inside diameter portion 120a thereof engages with a step portion 110a formed on the flange portion 111 of the base board 110 and is fixed to the base board 110 by a non-illustrated fixture (for example, a bolt).

Moreover, to the pulley pressing base 120, a pulley pressing ring 130 is attached. The pulley pressing ring 130 is formed in the shape of a stepped ring, and attached to the pulley pressing base 120 by a bolt 440. The lower end surface of the pulley pressing ring 130 is formed as a pulley pressing surface 130a that abuts on the pulley 40 and presses it downward. Moreover, an inner peripheral surface 130b of the pulley pressing ring 130 supports a later-described damper rubber pressing ring 180 such that it is slidable, and an outer peripheral surface 130c is opposed to an inner peripheral surface 140a of a later-described pulley centering ring 140.

The pulley pressing ring 130 supports the pulley centering ring 140 such that it is relatively movable in the vertical direction. Moreover, to the pulley pressing ring 130, an outer ring 150 disposed on the outer periphery side of the pulley centering ring 140 is fixed by a bolt 450. The pulley centering ring 140 is held by the pulley pressing ring 130 and the outer ring 150 with the inner peripheral surface 140a thereof being opposed to the outer peripheral surface 130c of the pulley pressing ring 130 and an outer peripheral surface 140b thereof being opposed to an inner peripheral surface 150a of the outer ring 150. Regarding the pulley centering ring 140, the movement relative to the pulley centering ring 140 is restricted by an inner protrusion 151 formed in such a manner as to protrude inward on the inner peripheral surface 150a of the outer ring 150.

The pulley centering ring 140 has on the lower end portion thereof a tapered portion 141 where a tapered surface 141a oriented toward the inner periphery side is formed. The tapered portion 141 abuts on an axial end portion 41b (see FIG. 3) of the pulley 40 in the centering process described later. The pulley centering ring 140 is pushed downward by a pressing spring 270 held by the pulley pressing ring 130 so that a step portion 140d thereof abuts on the inner protrusion 151 of the outer ring 150, whereby the axial movement is restricted so that the pulley centering ring 140 is set in the initial position. When the pulley centering ring 140 abuts on the pulley 40 to be pushed upward, the pressing spring 270 is compressed so that the pulley centering ring 140 moves upward relatively to the pulley pressing ring 130. That is, the pressing spring 270 and the pulley pressing ring 130 constitute a pressing mechanism that elastically presses the pulley centering ring 140 against the work (the pulley 40).

To the boss portions 113 of the base board 110, a hub pressing ring 160 is fixed. The hub pressing ring 160 has a cylindrical shape with a bottom having a bottom portion 161 and a cylindrical portion 162, and the bottom portion 161 is fixed to the boss portions 113 of the base board 110 by a bolt 420. An outer peripheral surface 162a of the cylindrical portion 162 is opposed through a predetermined gap (clearance) with the inner peripheral surface 130b of the pulley pressing ring 130, and in this gap, a cylindrical portion 182 of the damper rubber pressing ring 180 described later is accommodated in such a manner as to be slidable. The end surface of the cylindrical portion 162 of the hub pressing ring 160 is formed as a hub pressing surface 162b that abuts on the axial end surface of the hub 30 to press the hub 30 downward. Moreover, in the center of the bottom portion 161, a support hole 162c that supports a hub centering shaft 170 described next in such a manner as to be vertically slidable is formed.

The hub centering shaft 170 has a cylindrical shaft portion 171 inserted in the support hole 162c of the hub pressing ring 160 and an end portion 172 formed so as to be larger in diameter than the shaft portion 171 and provided integrally with the end portion of the shaft portion 171. The end portion 172 of the hub centering shaft 170 has on the outer peripheral portion thereof a tapered portion 173 where a tapered surface 173a oriented toward the outer periphery side of the hub centering shaft 170 is formed. The tapered portion 173 abuts on an axial end portion 31a (see FIG. 3) of the hub 30 in the centering process described later.

To the end portion of the shaft portion 171 of the hub centering shaft 170 on the side opposite to the end portion 172, a tubular boss end 190 is attached by a bolt 430. The hub centering shaft 170 is pushed downward by a pressing spring 260 disposed between the base board 110 and the boss end 190 so that an end portion 190a of the boss end 190 abuts on the hub pressing ring 160, whereby the axial movement is restricted so that the hub centering shaft 170 is set in the initial position. When the tapered portion 173 of the hub centering shaft 170 abuts on the hub 30 to be pushed upward, the pressing spring 260 is compressed so that the hub centering shaft 170 moves upward relatively to the hub pressing ring 160. That is, the pressing spring 260 and the boss end 190 constitute a pressing mechanism that elastically presses the hub centering shaft 170 against the work (the hub 30).

Here, the hub centering shaft 170 and the pulley centering ring 140 are disposed coaxially with the central axis C. The tapered portion 173 of the hub centering shaft 170 and the tapered portion 141 of the pulley centering ring 140 are disposed so that the coaxiality (runout) is not more than a predetermined one.

The damper rubber pressing ring 180 has a cylindrical shape with a bottom having a bottom portion 181 and the cylindrical portion 182, and on the bottom portion 181, a plurality of through holes 181a through which the boss portions 113 of the base board 110 pass are formed. The cylindrical portion 182 is slidable in a gap between the inner peripheral surface 130b of the pulley pressing ring 130 and the outer peripheral surface 162a of the hub pressing ring 160. The damper rubber pressing ring 180 is pushed downward by a plurality of pressing springs 280 disposed between the bottom portion 181 and the base board 110 so that a bottom portion inner surface 181b abuts on the hub pressing ring 160, whereby the movement is restricted so that the damper rubber pressing ring 180 is set in the initial position. In the present embodiment, the pressing springs 280 are fit on the boss portions 113.

As described above, in the upper jig 100, the hub centering shaft 170, the boss end 190 and the pressing spring 260 constitute the hub centering jig 11 that performs centering of the hub 30. The pulley centering ring 140 and the pressing spring 270 constitute the pulley centering jig 12 that performs centering of the pulley 40. Moreover, the pulley pressing ring 130 and the hub pressing ring 160 constitute the pressing jig 13 that presses the hub 30 and the pulley 40 toward the lower jig 200 in the axial direction.

(Structure of the Lower Jig 200)

The lower jig 200 is a jig that sandwiches the hub 30 and the pulley 40 with the upper jig 100 to support them. In the present embodiment, the press-fitting jig 300 that press-fits the damper rubber 50 into between the hub 30 and the pulley 40 is provided on the side of the lower jig 200.

The lower jig 200 is structured so as to be provided with a cylindrical inside support portion 210 for mounting the hub 30, an inside base 220 that fixes the inside support portion 210 and is disposed on the lower side of the inside support portion 210, an outside support portion 230 for mounting the pulley 40, and an outside base 240 that fixes the outside support portion 230 and is disposed on the lower side of the outside support portion 230. The inside support portion 210 and the inside base 220 are supported on a non-illustrated floor portion by non-illustrated pushing force applying means (for example, a spring or an air pressure). Moreover, the outside support portion 230 and the outside base 240 are also supported on the non-illustrated floor portion by non-illustrated pushing force applying means (for example, a spring or an air pressure). While in the present embodiment, the inside support portion 210 and the inside base 220, and the outside support portion 230 and the outside base 240 are supported on the floor portion by the pushing force applying means independently of each other, these may be coupled together so that they are supported on the floor portion by one pushing force applying means.

On the inside support portion 210, an inner peripheral surface 210a for positioning the hub 30 and a hub receiving surface 210b for receiving the hub 30 in the direction of the central axis C are formed. Moreover, the outside support portion 230 is provided with an annular protrusion 231 having an inner peripheral surface 231a on the outer edge thereof, and the pulley 40 is disposed inside this annular protrusion 231. Moreover, on the outside support portion 230, a pulley receiving surface 230b for receiving the pulley 40 in the direction of the central axis C is formed.

(Structure of the Press-Fitting Jig 300)

The press-fitting jig 300 is provided in such a manner as to protrude from the floor portion, and is formed of a cylindrical annular press-fitting member 310 fixed to the floor portion. In the present embodiment, the upper jig 100 is provided with the damper rubber pressing ring 180 and the pressing springs 280 in order that the damper rubber 50 press-fitted by the press-fitting jig 300 does not excessively protrude above the hub 30 and the pulley 40.

The annular press-fitting member 310 is provided in a gap portion 330 between an outer peripheral surface 200a of the inside support portion 210 and the inside base 220 and an inner peripheral surface 200b of the outside support portion 230 and the outside base 240, and is vertically movable relatively to the lower jig 200. In the present embodiment, since the annular press-fitting member 310 is fixed to the floor portion and the inside support portion 210 and the inside base 220, and the outside support portion 230 and the outside base 240 are supported on the floor portion by the pushing force applying means, when the lower jig 200 is pushed downward by the upper jig 100, the press-fitting jig 300 (the annular press-fitting member 310) is moved upward relatively to the lower jig 200.

(Structure of the Work)

As shown in FIG. 3, the hub 30 has a circular shape having a cylindrical outer peripheral surface 32a where the damper rubber 50 is press-fitted, and has in the center thereof an inside cylindrical portion 31 for fitting a rotation shaft such as a crankshaft when used. The hub 30 is formed of the inside cylindrical portion 31, an outside cylindrical portion 32 formed concentrically with the inside cylindrical portion 31, and a coupling portion 33 that couples the inside cylindrical portion 31 and the outside cylindrical portion 32 together in the radial direction. Substantially in the center of the outside cylindrical portion 32, a concave portion 32d for suppressing the axial movement of the press-fitted damper rubber 50 is formed.

An inside diameter side end portion of the inside cylindrical portion 31 in the axial direction is formed as the axial end portion 31a on which the tapered surface 173a of the tapered portion 173 of the hub centering shaft 170 abuts in the centering process described later. This axial end portion 31a is opposed to the upper jig 100 under a condition where the hub 30 is mounted on the lower jig 200. In mounting the hub 30 on the lower jig 200, an outer peripheral surface 31b of the inside cylindrical portion 31 faces the inner peripheral surface 210a of the inside support portion 210 of the lower jig 200, thereby positioning the hub 30 in the radial direction.

The pulley 40 has a circular shape where a plurality of protrusions 42 extending in the circumferential direction toward the outer periphery side of a cylindrical portion 41 having a cylindrical inner peripheral surface 41a are formed, and is disposed on the outer periphery of the hub 30 by opposing the cylindrical inner peripheral surface 41a to the cylindrical outer peripheral surface 32a of the hub 30. On a part of the cylindrical inner peripheral surface 41a of the cylindrical portion 41, which opposes the concave portion 32d of the hub 30, a convex portion 41e for suppressing the axial movement of the press-fitted damper rubber 50 is formed. An outside diameter side end portion of the cylindrical portion 41 in the axial direction is formed as the axial end portion 41b on which the tapered surface 141a of the tapered portion 141 of the pulley centering ring 140 abuts. This axial end portion 41b is opposed to the upper jig 100 under a condition where the pulley 40 is mounted on the lower jig 200.

In mounting the pulley 40 on the lower jig 200, a lower end outer peripheral surface 41d of the cylindrical portion 41 faces the inner peripheral surface 231a of the annular protrusion 231 of the outside support portion 230 of the lower jig 200, thereby positioning the pulley 40 in the radial direction.

The damper rubber 50 is made of a plate-like rubber material, and the thickness thereof is a thickness that can be press-fitted in a gap between the cylindrical outer peripheral surface 32a of the hub 30 and the cylindrical inner peripheral surface 41a of the pulley 40. Moreover, the width of the damper rubber 50 is a dimension corresponding to the width of the hub 30 and the pulley 40.

(Damper Pulley Manufacturing Method)

Next, a damper pulley manufacturing method will be described. The manufacture of the damper pulley is performed by the arranging process in which the hub 30 and the pulley 40 are disposed such that the cylindrical outer peripheral surface 32a of the hub 30 and the cylindrical inner peripheral surface 41a of the pulley 40 are opposed to each other, the centering process in which the tapered portion 173 of the hub centering shaft 170 is made to abut on the axial end portion 31a of the hub 30 and the tapered portion 141 of the pulley centering ring 140 is made to abut on the axial end portion 41b of the pulley 40 to thereby perform centering of the hub 30 and the pulley 40, and the press-fitting process in which after the centering process, the damper rubber 50 is press-fitted into between the cylindrical outer peripheral surface 32a of the hub 30 and the cylindrical inner peripheral surface 41a of the pulley 40. Hereinafter, these processes will be described in detail with reference to FIG. 3 to FIG. 6.

Figure 4:
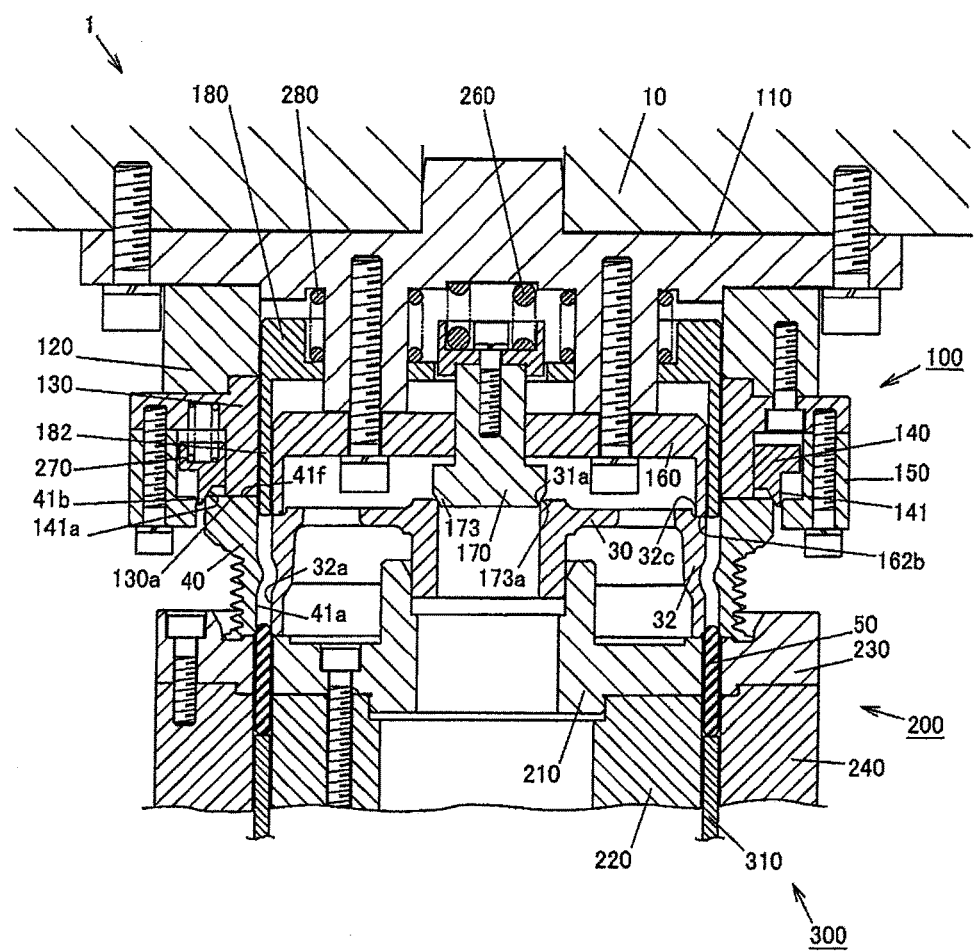
FIG. 4 is a cross-sectional view of the damper pulley and the manufacturing apparatus showing a damper pulley centering process.
Figure 5:
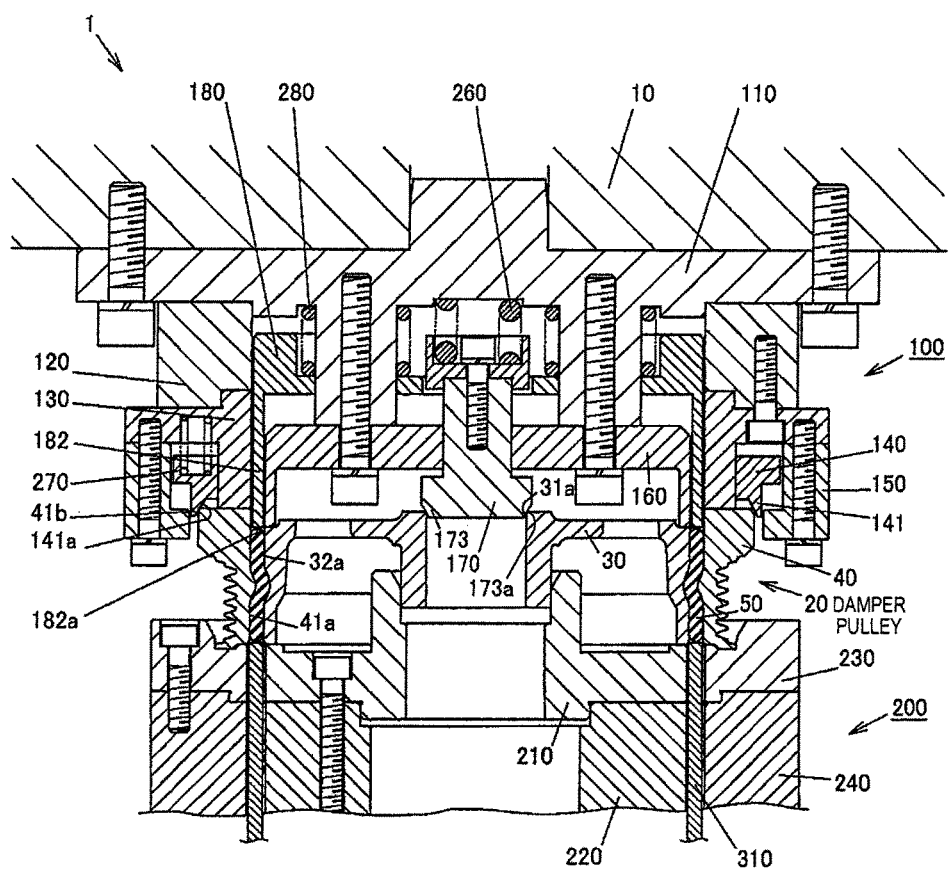
FIG. 5 is a cross-sectional view of the damper pulley and the manufacturing apparatus showing a damper pulley press-fitting process.
Figure 6:
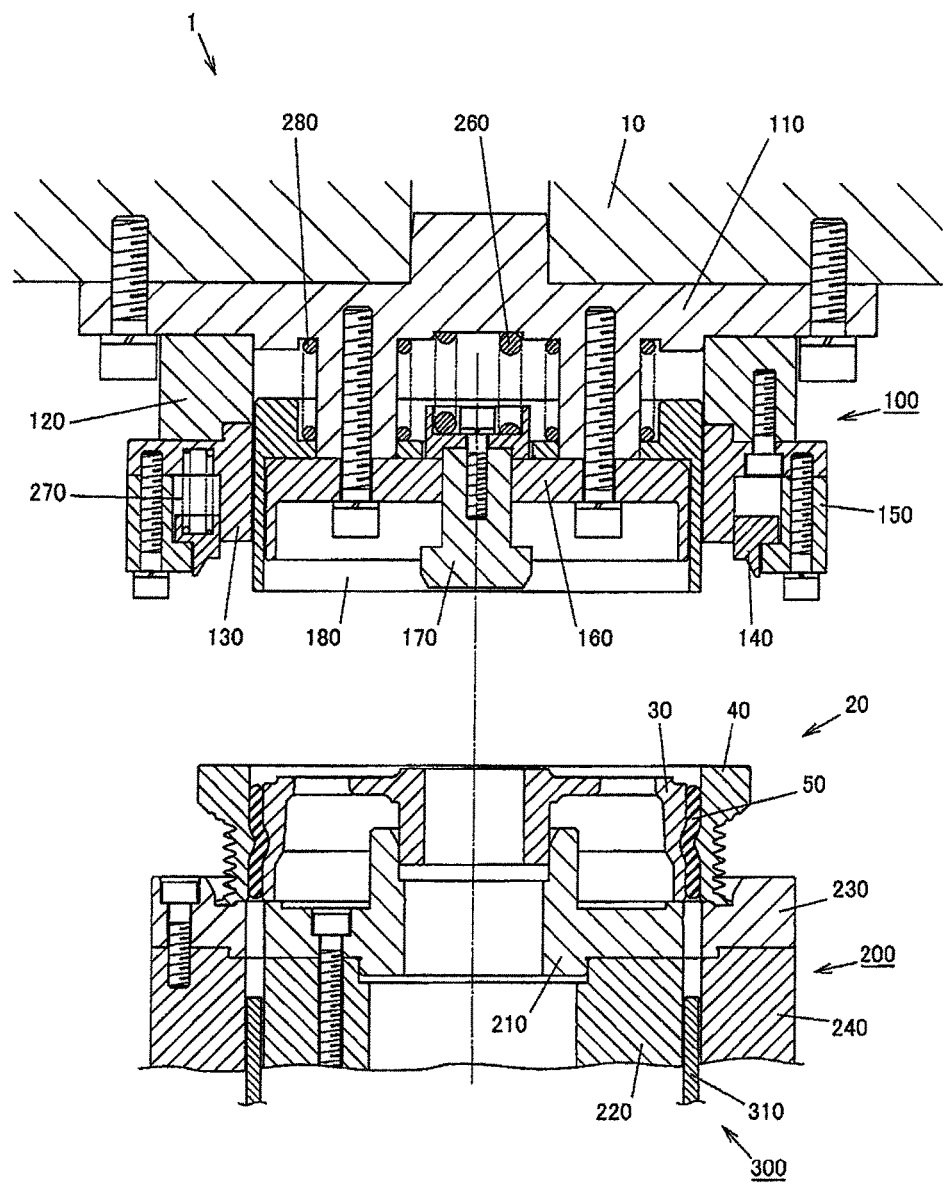
FIG. 6 is a cross-sectional view of the damper pulley and the manufacturing apparatus showing a damper pulley manufacture completed condition.

FIG. 3 shows the displacement process of the damper pulley manufacturing process, FIG. 4 shows the centering process thereof, and FIG. 5 shows the press-fitting process thereof. FIG. 6 shows a condition where the series of processes of the damper pulley manufacturing method according to the present embodiment has been finished.

(Arranging Process)

As shown in FIG. 3, in the arranging process, the damper rubber 50 is disposed being inserted into the gap portion 330 (shown in FIG. 1) of the lower jig 200. Then, the hub 30 and the pulley 40 are mounted on the lower jig 200.

The hub 30 is mounted by fitting the inside cylindrical portion 31 inside the inside support portion 210 of the lower jig 200 and making an end surface 32b of the outside cylindrical portion 32 abut on the hub receiving surface 210b of the inside support portion 210. The outer peripheral surface 31b of the inside cylindrical portion 31 is opposed to the inner peripheral surface 210a of the inside support portion 210. However, in order that the inside cylindrical portion 31 can be fitted in the inside support portion 210 of the lower jig 200 even if there is a dimension error of the hub 30, the dimensions of the parts are set so that a slight gap is formed between the outer peripheral surface 31b of the inside cylindrical portion 31 and the inner peripheral surface 210a of the inside support portion 210. That is, the inside cylindrical portion 31 is loosely fitted in the inside support portion 210 of the lower jig 200.

Moreover, the pulley 40 is mounted by fitting the cylindrical portion 41 into the outside support portion 230 such that the lower end outer peripheral surface 41d thereof faces the inner peripheral surface 231a of the annular protrusion 231 and making a lower end surface 41c abut on the pulley receiving surface 230b of the lower jig 200. However, in order that the cylindrical portion 41 can be fitted in the outside support portion 230 of the lower jig 200 even if there is a dimension error of the pulley 40, the dimensions of the parts are set so that a slight gap is formed between the lower end outer peripheral surface 41d of the cylindrical portion 41 and the inner peripheral surface 231a of the annular protrusion 231 of the outside support portion 230. That is, the cylindrical portion 41 is loosely fitted in the outside support portion 230.

(Centering Process)

As shown in FIG. 4, when the presser 10 descends so that the upper jig 100 moves downward, first, the tapered surface 173a of the tapered portion 173 of the hub centering shaft 170 abuts on the axial end portion 31a of the hub 30, and the tapered surface 141a of the tapered portion 141 of the pulley centering ring 140 abuts on the axial end portion 41b of the pulley 40. By the tapered portion 173 of the hub centering shaft 170 abutting on the axial end portion 31a of the hub 30, even if the hub 30 is decentered with respect to the inside support portion 210 of the lower jig 200 in the displacement process, the hub 30 receives a radial force from the part where the axial end portion 31a and the tapered surface 173a are in contact with each other, so that centering of the hub 30 is performed.

Moreover, by the tapered portion 141 of the pulley centering ring 140 abutting on the axial end portion 41b of the pulley 40, even if the pulley 40 is decentered with respect to the outside support portion 230 of the lower jig 200 in the displacement process, the pulley 40 receives a radial force from the part where the axial end portion 41b and the tapered surface 141a are in contact with each other, so that centering of the pulley 40 is performed. Thereafter, when the upper jig 100 further moves downward, the hub pressing surface 162b of the hub pressing ring 160 abuts on an end surface 32c of the outside cylindrical portion 32 of the hub 30 and the pulley pressing surface 130a of the pulley pressing ring 130 abuts on an upper end surface 41f of the pulley 40.

During the period from when the hub 30 is centered by the hub centering shaft 170 to when the hub pressing ring 160 abuts on the hub 30, the pressing spring 260 pushing the hub centering shaft 170 is compressed, whereby the tapered portion 173 of the hub centering shaft 170 continues to abut on the axial end portion 31a of the hub 30. Moreover, from when centering of the pulley 40 is performed by the pulley centering ring 140 to when the pulley pressing ring 130 abuts on the pulley 40, the pressing spring 270 pushing the pulley centering ring 140 is compressed, whereby the tapered portion 141 of the tapered portion 141 continues to abut on the axial end portion 41*b* of the pulley 40.

Since the tapered portion 173 of the hub centering shaft 170 and the tapered portion 141 of the pulley centering ring 140 are set so that the coaxiality (runout) is not more than a predetermined one, the centering of the hub 30 and the pulley 40 is accurately performed by the above-described centering process. Moreover, this centering accuracy makes the gap between the cylindrical outer peripheral surface 32*a* of the hub 30 and the cylindrical inner peripheral surface 41*a* of the pulley 40 substantially uniform all over the circumference.

(Press-Fitting Process)

The press-fitting process is performed under a condition where the abutting conditions of the hub 30 and the hub centering shaft 170 and of the pulley 40 and the pulley centering ring 140 are maintained. More specifically, the press-fitting process is performed under a condition where the hub centering shaft 170 is elastically pressed against the hub 30 and the pulley centering ring 140, against the pulley 40.

In this press-fitting process, the upper jig 100 is further moved downward together with the lower jig 200 from the centering process completed condition. Since the lower jig 200 (the inside support portion 210 and the inside base 220, and the outside support portion 230 and the outside base 240) is pressed downward through the work (the hub 30 and the pulley 40), the damper rubber 50 supported by the annular press-fitting member 310 relatively ascends to be press-fitted into the gap between the cylindrical outer peripheral surface 32*a* of the hub 30 and the cylindrical inner peripheral surface 41*a* of the pulley 40.

At the time of this press-fitting, in order to suppress upward projection (excess press-fitting) due to the press-fitting, the damper rubber 50 is pressed down with a predetermined force by an end surface 182*a* of the cylindrical portion 182 of the damper rubber pressing ring 180 pushed downward by the pressing springs 280.

After the above-described press-fitting process, as shown in FIG. 6, the completed work (a damper pulley 20) can be taken out by moving the upper jig 100 upward.

Comparative Example

Figure 7:
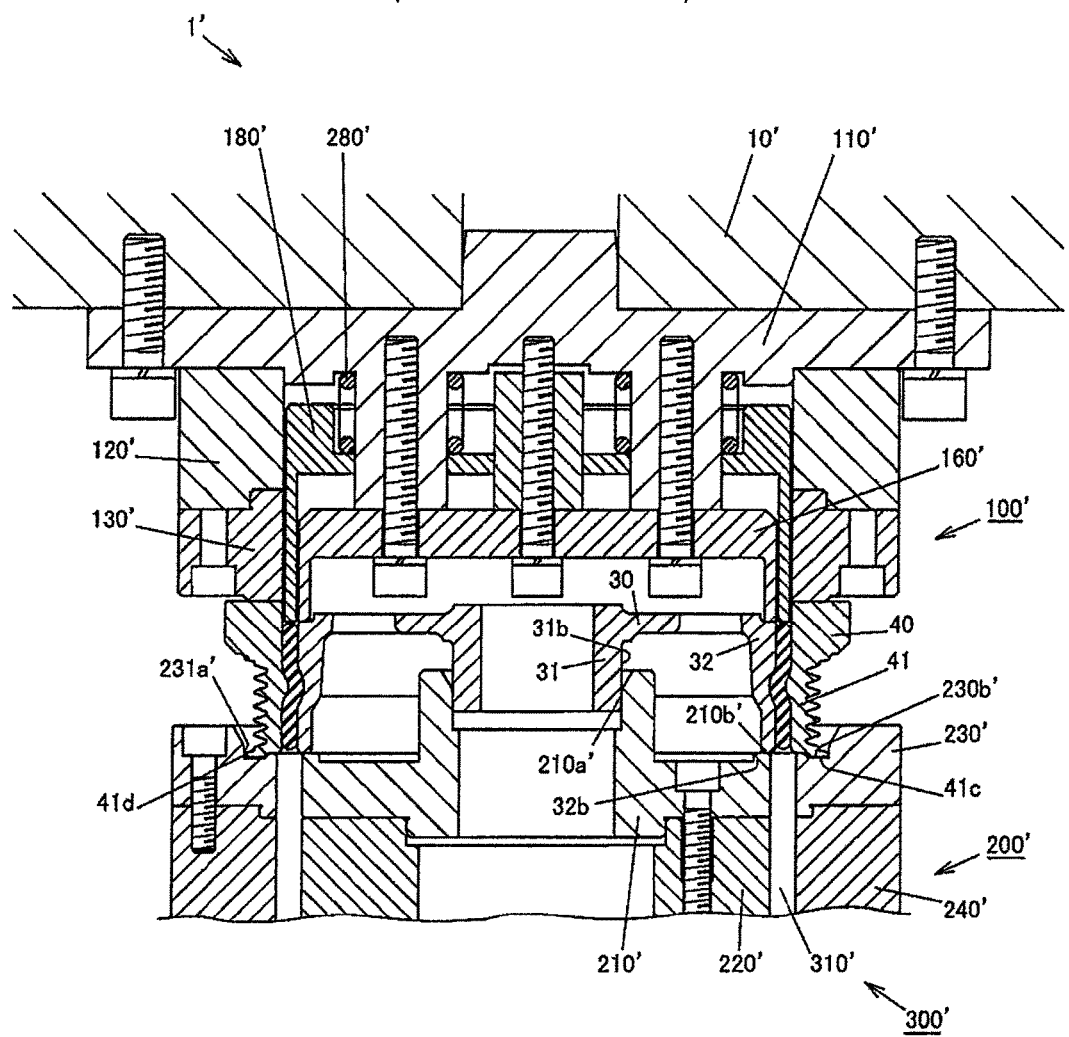
FIG. 7 is a cross-sectional view showing a damper pulley manufacturing apparatus according to a comparative example.

FIG. 7 is a cross-sectional view showing a damper pulley manufacturing apparatus 1' according to a comparative example. This manufacturing apparatus 1' is structured similarly to the manufacturing apparatus 1 according to the above-described embodiment except that an upper jig 100' has neither the hub centering jig 11 nor the pulley centering jig 12. Of the manufacturing apparatus 1' according to the comparative example, components having functions common to those of the components of the manufacturing apparatus 1 according to the above-described embodiment are denoted by the reference designations used in FIGS. 1 to 6 which designations are marked with "'" (dash), and overlapping descriptions thereof are omitted.

In the manufacturing apparatus 1', the hub 30 is mounted on a lower jig 200' by opposing the outer peripheral surface 31*b* of the inside cylindrical portion 31 to an inner peripheral surface 210*a*' of the lower jig 200' so as to be fitted in an inside support portion 210' and making the end surface 32*b* of the outside cylindrical portion 32 abut on a hub receiving surface 210*b*' of the lower jig 200'. Moreover, the pulley 40 is mounted on the lower jig 200' by opposing the lower end outer peripheral surface 41*d* of the cylindrical portion 41 to an inner peripheral surface 231*a*' of an annular protrusion 231' of an outside support portion 230' so as to be fitted in the outside support portion 230' and making the lower end surface 41*c* abut on a pulley receiving surface 230*b*' of the lower jig 200'. However, a slight gap is formed between the outer peripheral surface 31*b* of the inside cylindrical portion 31 of the hub 30 and the inner peripheral surface 210*a*' of the inside support portion 210' of the lower jig 200' and between the lower end outer peripheral surface 41*d* of the cylindrical portion 41 of the pulley 40 and the inner peripheral surface 231*a*' of the annular protrusion 231' of the outside support portion 230', the hub 30 and the pulley 40 are mounted on the lower jig 200' with a clearance (looseness) in the radial direction.

For this reason, the centering accuracy (coaxiality) of the hub 30 and the pulley 40 is insufficient, and if the damper rubber 50 is press-fitted under this condition, in the completed damper pulley 20, it is necessary to process the outer peripheral surface of the pulley 40 by after-processing to secure deflection accuracy.

Figure 8:
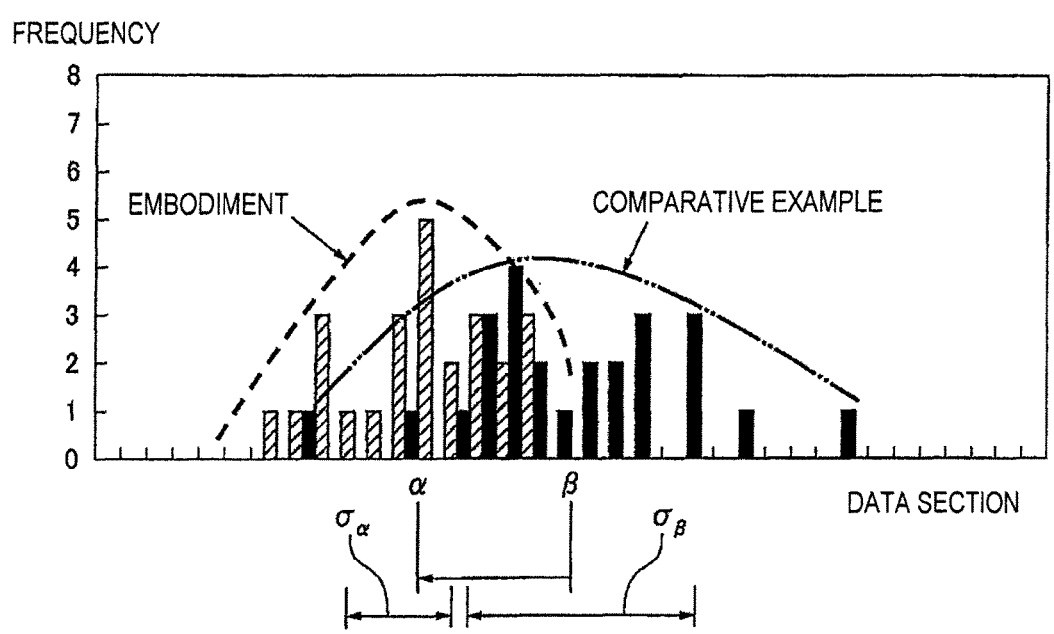
FIG. 8 is a graph showing the distribution condition of a pulley outside diameter deflection with respect to the embodiment and the comparative example.

FIG. 8 is a graph showing the distribution condition of the pulley outside diameter deflection when the damper pulley 20 is manufactured by using the manufacturing apparatus 1 according to the present embodiment and the manufacturing apparatus 1' according to the comparative example, the vertical axis shows the frequency, and the horizontal axis shows the data section.

In FIG. 8, the average value of the pulley outside diameter deflection of the damper pulley 20 manufactured by the manufacturing apparatus 1 according to the present embodiment is $\alpha$, and the average value of the pulley outside diameter deflection of the damper pulley 20 manufactured by the manufacturing apparatus 1' according to the comparative example is $\alpha$. Comparing these average values, $\alpha<\beta$, and the pulley outside diameter deflection width is smaller in the damper pulley 20 manufactured by the manufacturing apparatus 1 according to the present embodiment. Moreover, when the standard deviation of the distribution of the pulley outside diameter deflection of the damper pulley 20 manufactured by the manufacturing apparatus 1 according to the present embodiment is $\sigma_\alpha$ and the standard deviation of the distribution of the pulley outside diameter deflection of the damper pulley 20 manufactured by the manufacturing apparatus 1' according to the comparative example is $\sigma_\beta$, $\sigma_\alpha<\sigma_\beta$, variations in pulley outside diameter deflection width is smaller in the damper pulley 20 manufactured by the manufacturing apparatus 1 according to the present embodiment.

According to the above data, in the damper pulley 20 manufactured by the conventional damper pulley manufacturing method shown in the comparative example, after-processing such as lathe turning is necessary in order to ensure deflection accuracy of the pulley 40 after manufacture; however, in the damper pulley 20 according to the present embodiment, from the pulley outside diameter deflection distribution data shown in FIG. 8, that is, from the average value a and the standard deviation $\sigma_\alpha$, the required deflection accuracy can be ensured without after-processing after the press-fitting processing.

Workings and Effects of the Embodiment

According to the above-described embodiment of the present invention, the workings and effects described in the following are obtained:

(1) The hub 30 and the pulley 40 are centered by the hub centering jig 11 (the hub centering shaft 170, the boss end 190, and the pressing spring 260) and the pulley centering jig 12 (the pulley centering ring 140 and the pressing spring 270) and thereafter, the damper rubber 50 is press-fitted between the hub 30 and the pulley 40 in the press-fitting process, so that when the completed damper pulley 20 is rotated about the hub 30, the runout of the pulley 40 can be reduced.

(2) Since the press-fitting process is performed under a condition where the abutting conditions of the hub 30 and the hub centering shaft 170 and of the pulley 40 and the pulley centering ring 140 in the press-fitting process are maintained, misalignment of the hub 30 and the pulley 40 is suppressed even if the hub 30 and the pulley 40 receive a radial force from the press-fitted damper rubber 50 in the press-fitting process.

(3) Since the hub centering shaft 170 is elastically pressed against the hub 30 and the pulley centering ring 140 is elastically pressed against the pulley 40, in the centering process, after the tapered portion 173 of the hub centering shaft 170 is made to abut on the axial end portion 31a of the hub 30 and the tapered portion 141 of the pulley centering ring 140 is made to abut on the axial end portion 41b of the pulley 40, the upper jig 100 is further moved down, the end surface 32c of the outside cylindrical portion 32 of the hub 30 is pressed by the hub pressing surface 162b of the hub pressing ring 160, and the upper end surface 41f of the pulley 40 is pressed by the pulley pressing surface 130a of the pulley pressing ring 130, whereby the hub 30 and the pulley 40 can be fixed. Thereby, the hub 30 and the pulley 40 are fixed in a state of being centered, so that misalignment in the press-fitting process can be reliably suppressed.

(4) Since the damper pulley manufactured by the present embodiment has sufficient deflection accuracy (coaxiality), it is unnecessary to ensure deflection accuracy of the pulley 40 by after-processing. Since after-processing is not required, advantages such as reduction in processing time, facilitation of process management and reduction in manufacturing cost are obtained.

While the damper pulley manufacturing method and the damper pulley manufacturing apparatus of the present invention have been described above based on the embodiment, the present invention is not limited to this embodiment and may be carried out in various forms without departing from the scope thereof.

For example, while a case where the upper jig 100 is pressed downward by the presser 10 is described in the above-described embodiment, the present invention is not limited thereto; a structure where the lower jig 200 is pressed upward may be adopted. Moreover, the position where the tapered portion 173 of the hub centering shaft 170 abuts on the hub 30 is not limited to the position specifically shown in the above-described embodiment as long as it is the axial end portion of the hub 30. Likewise, the position where the tapered portion 141 of the pulley centering ring 140 abuts on the pulley 40 is not limited to the position specifically shown in the above-described embodiment as long as it is the axial end portion of the pulley 40.

The present application is based upon Japanese Patent Application (No. 2013-110206) filed on May 24, 2013, the contents of which are incorporated herein by reference.

DESCRIPTION OF REFERENCE SIGNS

10: Presser; 10a: lower surface; 10b: fitting hole; 11: hub centering jig; 12: pulley centering jig; 13: pressing jig; 20: damper pulley; 30: hub; 31: inside cylindrical portion; 31a: axial end portion; 31b: outer peripheral surface; 32: outside cylindrical portion; 32a: cylindrical outer peripheral surface; 32b, 32c: end surface; 32d: concave portion; 33: coupling portion; 40: pulley; 41: cylindrical portion; 41a: cylindrical inner peripheral surface; 41b: axial end portion; 41c: lower end surface; 41d: lower end outer peripheral surface; 41e: convex portion; 41f: upper end surface; 42: protrusion; 50: damper rubber; 100: upper jig; 110: base board; 110a: step portion; 111: flange portion; 111a: lower surface; 112: fitting convex portion; 113: boss portion; 120: pulley pressing base; 120a: inside diameter portion; 130: pulley pressing ring; 130a: pulley pressing surface; 130b: inner peripheral surface; 130c: outer peripheral surface; 140: pulley centering ring; 140a: inner peripheral surface; 140b: outer peripheral surface; 140d: step portion; 141: tapered portion; 141a: tapered surface; 150: outer ring; 150a: inner peripheral surface; 151: inner protrusion; 160: hub pressing ring; 161: bottom portion; 162: cylindrical portion; 162a: outer peripheral surface; 162b: hub pressing surface; 162c: support hole; 170: hub centering shaft; 171: shaft portion; 172: end portion; 173: tapered portion; 173a: tapered surface; 180: damper rubber pressing ring; 181: bottom portion; 181a: through hole; 181b: bottom portion inner surface; 182: cylindrical portion; 182a: end surface; 190: boss end; 190a: end portion; 200: lower jig; 200a: outer peripheral surface; 200b: inner peripheral surface; 210: inside support portion; 210a: inner peripheral surface; 210b: hub receiving surface; 220: inside base; 230: outside support portion; 230b: pulley receiving surface; 231: annular protrusion; 231a: inner peripheral surface; 240: outside base; 260, 270, 280: pressing spring; 300: press-fitting jig; 310: annular press-fitting member; 330: gap portion; 410, 420, 430, 440, 450: bolt.

The invention claimed is:

1. A damper pulley manufacturing method comprising:
an arranging process of arranging a circular hub having a cylindrical outer peripheral surface and a circular pulley having a cylindrical inner peripheral surface such that the cylindrical outer peripheral surface opposes the cylindrical inner peripheral surface;
a centering process of abutting a tapered surface of a first centering jig on an axial end portion of the hub and abutting a second tapered surface of a second centering jig on an axial end portion of the pulley to perform centering of the hub and the pulley; and
a press-fitting process performed after the centering process, of press-fitting a damper rubber between the cylindrical outer peripheral surface and the cylindrical inner peripheral surface, wherein the press-fitting process is performed under a condition where the abutting condition of the hub and the first centering jig and the abutting condition of the pulley and the second centering jig in the centering process are maintained.

2. The damper pulley manufacturing method according to claim 1,
wherein the first centering jig is elastically pressed against the hub, and the second centering jig is elastically pressed against the pulley.

3. A damper pulley manufacturing apparatus comprising:
an upper jig comprising:
a centering jig comprising:
a hub centering jig that comprises a first tapered surface and that performs centering by making the first tapered surface abut on an axial end portion of a circular hub having a cylindrical outer peripheral surface, and
a pulley centering jig that comprises a second tapered surface and that performs centering by making the second tapered surface abut on an axial end portion of a circular pulley having a cylindrical inner peripheral surface; and a pressing jig that presses the hub and the pulley in an axial direction;

a lower jig that sandwiches the hub and the pulley with the upper jig to support the hub and the pulley; and a press-fitting jig that press-fits a damper rubber into a gap portion between the cylindrical outer peripheral surface of the hub and the cylindrical inner peripheral surface of the pulley while the abutting condition of the hub and the hub centering jig and the abutting condition of the pulley and the pulley centering jig are maintained.

4. The damper pulley manufacturing apparatus according to claim 3, wherein the centering jig is provided with a pressing mechanism which elastically presses the hub centering jig against the hub, and which elastically presses the pulley centering jig against the pulley.

5. The damper pulley manufacturing apparatus according to claim 4, wherein the press-fitting jig is attached on a lower jig side.

6. The damper pulley manufacturing apparatus according to claim 3, wherein the press-fitting jig is attached on a lower jig side.

7. A damper pulley manufacturing method comprising:

an arranging process of supporting a lower axial end of a circular hub having a cylindrical outer peripheral surface and a lower axial end of a circular pulley having a cylindrical inner peripheral surface on a lower jig such that the cylindrical outer peripheral surface opposes the cylindrical inner peripheral surface;

a centering process of sandwiching the circular hub and circular pulley between the lower jig and first and second centering jigs, and abutting a tapered surface of the first centering jig on an upper axial end portion of the hub and abutting a second tapered surface of the second centering jig on an upper axial end portion of the pulley to perform centering of the hub and the pulley sandwiched between the lower jig and the first and second centering jigs;

a press-fitting process performed after the centering process, of press-fitting a damper rubber into a gap between the cylindrical outer peripheral surface and the cylindrical inner peripheral surface wherein the press-fitting process is performed under a condition where the abutting condition of the hub and the first centering jig and the abutting condition of the pulley and the second centering jig in the centering process are maintained.

* * * * *